United States Patent [19]

Horner, Jr.

[11] Patent Number: 4,979,293
[45] Date of Patent: Dec. 25, 1990

[54] MANUFACTURING A PUSH ROD

[75] Inventor: Charles B. Horner, Jr., South Bend, Ind.

[73] Assignee: Allied-Signal Inc., Morristown, N.J.

[21] Appl. No.: 526,342

[22] Filed: May 21, 1990

[51] Int. Cl.$^5$ .............................................. B23P 15/00
[52] U.S. Cl. ..................................... 29/888.2; 29/558; 29/523; 29/525
[58] Field of Search ...................... 29/888.2, 558, 523, 29/525

[56] References Cited

U.S. PATENT DOCUMENTS 3,059,627 10/1962 Dadd ....................................... 29/525
4,419,804 12/1983 Axthammer ........................... 29/525

Primary Examiner—Timothy V. Eley
Assistant Examiner—C. Richard Martin
Attorney, Agent, or Firm—Leo H. McCormick, Jr.; Ken C. Decker

[57] ABSTRACT

A method of manufacturing a push rod (10) for a brake booster. The push rod (10) has a stem (12) connected to a head (14). Head (14) is formed from a blank (30) by first machining an axial cavity (36) in an end 34 in a cylindrical body and then fine blanking an axial projection (46) on the other end (32). Thereafter, the depth of the cavity (36) is finalized and an opening (52) drilled along the central axis of the blank (30) to produce the head (14). On insertion of the stem (12) in the opening (52) the push rod (10) is produced.

4 Claims, 2 Drawing Sheets

MANUFACTURING A PUSH RODMANUFACTURING A PUSH ROD

This invention relates to a method of manufacturing a push rod wherein the head is machined and stamped from a blank and later attached to a stem to form an integral component.

Push rods for use in a brake boosters have been stamped out of a piece of bar stock. This type push rod has performed in an adequate manner to transmit the output force from a movable wall to move a piston in a master cylinder.

Recently designed brake boosters of the type disclosed in U.S. patent application 392,876, filed Aug. 14, 1989, have incorporated a push rod wherein the head of the push rod encapsulates the reaction disc. In the manufacture of the head for this push rod, the machining cavity for retention of the push rod results in the scrap of considerable material. This scrap adds to the cost of the push rod.

In an effort to reduce the cost of the push rod, the invention disclosed herein exhibits a reduction of the scrap while at the same time producing the same quality of product.

In the method of manufacturing a push rod as disclosed herein, a blank is cut from a source and a cavity is machined to a fixed depth. Thereafter, the blank is placed in a die and a uniform force applied to the entire blank with the exception of an area along the central axis. A tool is inserted in the cavity and a force applied causing the material in the central area to shear and produce a projection extending from the blank. An opening is machined through the projection along the axial center into the cavity. The cavity is further machined to a predetermined depth to define a wall having a desired thickness. A stem is inserted in the opening and forms an interference fit with material in the projection to complete the manufacture of the push rod. In some instances a annular radial groove is machined in the bottom of the cavity extends from the opening. After the stem is inserted in the opening, the end thereof is stuck a blow causing a portion of the stem to flow into the groove and form a riveted connection between the head and the stem.

It is an object of this invention to provide a method of manufacturing a push rod wherein a machined and fine blanked head is attached to a stem member.

It is another object of this invention to provide a method of manufacturing a push rod through the use of substantially less material than through a previously used machining process.

It is a further object of this invention to provide a method of manufacturing a push rod for a brake booster having head member that is attached to a stem through a riveted connection.

An advantage of this invention is in the reduction of scrap material in the head of the resulting push rod.

These advantages and object should be apparent from reading this specification while viewing the drawings wherein.

Figure 8:
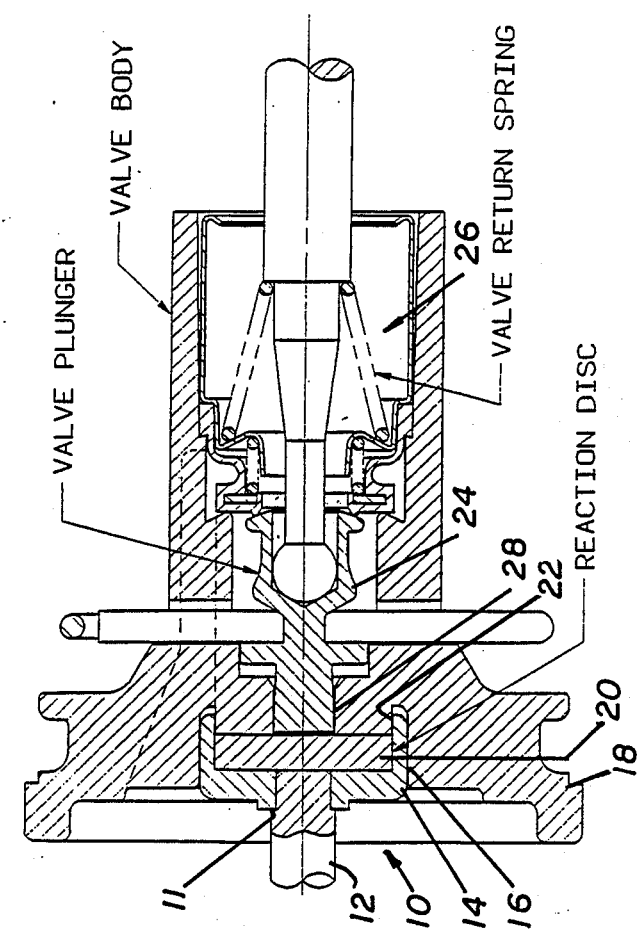
FIG. 8 is a sectional view of the head shown in FIG. 6 after being attached to the stem and located in the hub of a control valve in a brake booster.

The push rod 10 shown in FIG. 8 is made according to this invention hereinafter disclosed. The push rod 10 has a stem 12 attached to a head 14. The head 14 is located in a bore 16 of hub 18 for a brake booster of the type disclosed in U.S. Pat. No. 392,876 filed Aug. 14, 1989.

Head 14 which surrounds a reaction disc 20 engages annular guide or bearing 22 to encapsulate the reaction disc 20. Plunger 24 in the control valve 26 is retained in opening 28 of bearing 22. On movement of hub 18 in a brake booster, forces are communicated through bearing 22 into the reaction disc 20 to push rod 10 for moving a piston in a master cylinder.

Figure 1:
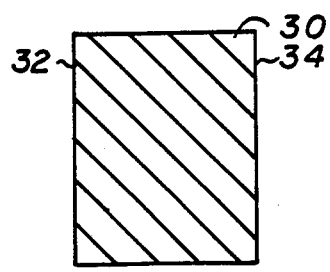
FIG. 1 is a sectional view of a blank for use in the manufacture of a head for a push rod according to the principals of this invention.
Figure 2:
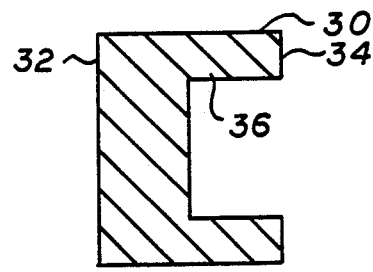
FIG. 2 is a sectional view of the blank of FIG. 1 with a cavity machined in one end thereof.
Figures 3, 4:
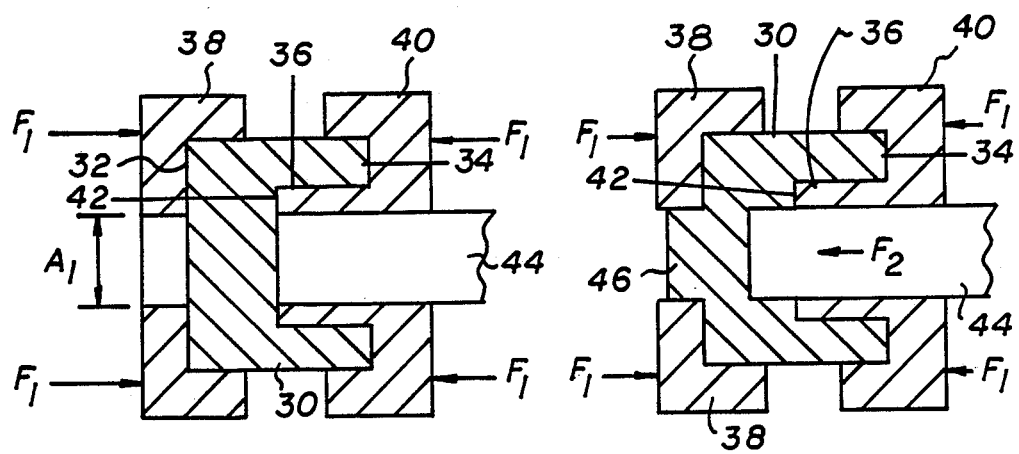
FIG. 3 is a sectional view of the blank of FIG. 2 located in a die of a fine blanking apparatus.
FIG. 4 is a sectional view of the blank of FIG. 3 after a tool has struck the unsupported axial center.

The push rod 10 is manufactured in accordance to a process hereinafter disclosed. A blank 30 as shown in FIG. 1 is cut from supply bar stock. The length of blank 30 is approximately 80% of heads made according to other machining processes which translates into a savings of approximately 15% in material cost. Blank 30 which is a cylinder with a first end 32 and a second end 34. Blank 30 is transported from a supply container to a first station shown in FIG. 2 where a cavity 36 is machined or drilled therein from the second end 34 toward the first end 32. After cavity 36 is machined to a depth of approximately one half of the total length between the first end 32 and the second end 34, blank 30 is transported to a second station as shown in FIG. 3.

Figures 5, 6, 7:
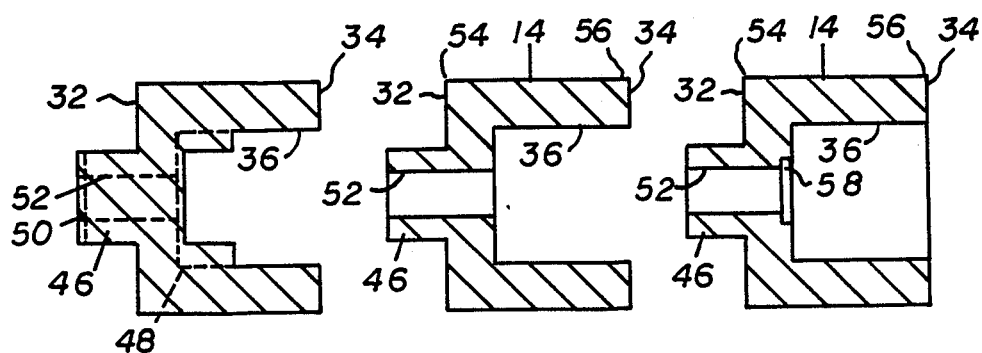
FIG. 5 is a sectional view of the blank after the removal from the die shown in FIG. 4.
FIG. 6 is a sectional view of the blank shown in FIG. 5 after the cavity therein has been machined and an opening has been placed in the axial projection to form the head of the push rod.
FIG. 7 is a sectional view of the head of FIG. 6 with a groove machined in the bottom of the cavity around the opening.

At the second station, blank 30 is placed in a fine blanking die having a first section 38 and a second section 40. Blank 30 is compressed between the first and second sections 38 and 40 by a force $F_1$ which is uniformly applied to the entire first end 30, the second end 34 and the bottom 42 of cavity 36 with the exception of an annular area A located along the central axis of the blank. A tool or punch 44 inserted in the second section 40 of the die is brought into engagement with the bottom 42 of the cavity 36. Tool 44 is struck with a force $F_2$ of approximately 10.5 tons or 9500K causing the unsupported material represented by area A to shear and create a projection 46 as shown in FIG. 4. Blank 30 on removal from the die has a shape as shown in FIG. 5. Thereafter, blank 30 is transported to a third station for final machining where material represented by dash line 48 is removed from cavity 36, by dash line 50 from projection 46 and an opening 52 is drilled along the central axis to produce head 14 as shown in FIG. 6. The sharp edges 54 and 56 on the peripheral surface of the first 32 and second 34 ends are removed and the stem 12 inserted in opening 52 to produce the push rod 10.

Under some circumstances, it may be desirable to have a more positive connection between the stem 12 and head 14 than the interference fit shown in FIG. 8. To develop a positive fit, a annular groove 58 is machined in the bottom of cavity adjacent opening 52.

When stem 12 is inserted into opening and shoulder 11 brought into engagement with projection 46 the end of the stem extends above the bottom of cavity 36. The end of the stem 12 is struck a blow causing the same to flow into groove 58 to rivet the stem 12 to head 14 and provide a positive connection.

I claim:

1. A method of manufacturing a push rod for an output member of a brake booster comprising the steps of:

cutting a blank from a source of material, said blank having a central axis a first end and a second end;

machining a cavity in said blank, said cavity extending from said second end toward said first end;

placing said blank in a first die;

applying a uniform force to said blank with the exception of an annular area that extends through the central axis from the first end to the second end;

striking said annular area with a force causing material in said blank to shear and create a projection that extends from said first end;

removing said blank from said die;

machining said blank to remove additional material and enlarge said cavity until an end wall of a predetermined thickness is established between said first end and the cavity;

creating an opening along the central axis through the projection; and inserting a shaft in said opening until the end of said shaft reaches said projection.

2. The method of manufacturing a push rod as recited in claim 1 further including the step of:

machining a surface on said projection to define a shoulder that is substantially parallel to said first end.

3. The method of manufacturing a push rod as recited in claim 2 further including the step of:

machining an annular groove in said wall around said opening, said annular groove being located in the cavity.

4. The method of manufacturing a push rod as recited in claim 3 further including the step of:

striking said shaft with a force causing a portion on the end thereof to flow into said annular groove and fix the shaft to the blank.

* * * * *